(12) United States Patent
Fox et al.

(10) Patent No.: US 12,714,119 B2
(45) Date of Patent: Aug. 25, 2026

(54) SMOKE CONTROL IN AN INDOOR SMOKER

(71) Applicant: Haier US Appliance Solutions, Inc., Wilmington, DE (US)

(72) Inventors: Steven Fox, Daytona Beach, FL (US); Daniel Carballo, Louisville, KY (US); Tomas Garces, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 454 days.

(21) Appl. No.: 18/319,763

(22) Filed: May 18, 2023

(65) Prior Publication Data

US 2024/0381883 A1 Nov. 21, 2024

(51) Int. Cl.
*A23B 4/052* (2006.01)
*F24B 13/04* (2006.01)

(52) U.S. Cl.
CPC .............. *A23B 4/052* (2013.01); *F24B 13/04* (2013.01)

(58) Field of Classification Search
CPC .... A47J 37/0754; A47J 37/0629; A47J 36/32; A23B 4/056; A23B 4/0523; F23B 50/00; F23B 2700/013; F23B 2900/00001
See application file for complete search history.

(56) References Cited

U.S. PATENT DOCUMENTS 3,721,177 A 3/1973 Booker
8,800,542 B1 * 8/2014 Kennington .......... F24B 15/005 99/333
10,624,358 B2 4/2020 Akinbobola et al.
10,842,161 B2 11/2020 Luther et al.
11,109,599 B2 9/2021 Garces et al.
2018/0279634 A1 * 10/2018 Norris ........................ A23L 5/17
2019/0008321 A1 * 1/2019 Allmendinger ......... F24B 7/005
2019/0335773 A1 * 11/2019 Garces ....................... A23L 5/17
2020/0214501 A1 * 7/2020 Gafford ............... A47J 37/0754
2020/0375396 A1 * 12/2020 Rahmani ............. A47J 37/0786
2021/0037840 A1 * 2/2021 Garces ................... A23B 4/056

* cited by examiner

*Primary Examiner* — Brian W Jennison
(74) *Attorney, Agent, or Firm* — Dority & Manning, P.A.

(57) ABSTRACT

An indoor smoker includes a smoking chamber positioned within a cabinet and a smoke generating assembly configured for selectively smoldering combustible material to create a flow of smoke. A controller is in operative communication with the smoke generating assembly and is configured to receive a command to perform a smoking process at a smoke duty cycle, wherein the smoke duty cycle corresponds to a time relationship between an ON state and an OFF state of the smoke generating assembly, where the controller operates the smoke generating assembly to perform the smoking process utilizing the smoke duty cycle.

13 Claims, 9 Drawing Sheets

SMOKE CONTROL IN AN INDOOR SMOKER

FIELD OF THE INVENTION

The present subject matter relates generally to indoor smokers, and more particularly to systems and methods of controlling smoke generation in an indoor smoker.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

Notably, conventional smokers include smoke generation systems that rely on burning combustible material, e.g., wood chunks, chips, or pellets. However, the combustion of these materials is an exothermic reaction that typically continues until the combustible material is fully consumed. Accordingly, conventional smoking cycles have very heavy smoke generation at the commencement of the smoking cycle, followed by a slow decay in smoke generation as the combustible material is consumed. Oftentimes, this manner of smoke application results in incomplete penetration of smoke and uncontrollable levels of smokiness.

Accordingly, a smoker that has features improving the manner that smoke is introduced into the chamber is desirable. More specifically, a smoker that includes a smoke generating assembly that facilitates adjustable smoke levels would be particularly beneficial.

BRIEF DESCRIPTION OF THE INVENTION

Aspects and advantages of the invention will be set forth in part in the following description, may be apparent from the description, or may be learned through practice of the invention.

In one exemplary embodiment, an indoor smoker defining a vertical direction, a lateral direction, and a transverse direction is provided. The indoor smoker includes a cabinet, a smoking chamber positioned within the cabinet, a smoke generating assembly configured for selectively smoldering combustible material to create a flow of smoke, and a controller in operative communication with the smoke generating assembly. The controller is configured to receive a command to perform a smoking process at a smoke duty cycle, wherein the smoke duty cycle corresponds to a time relationship between an ON state and an OFF state of the smoke generating assembly and operate the smoke generating assembly to perform the smoking process utilizing the smoke duty cycle.

In another exemplary embodiment, a method of operating an indoor smoker is provided. The indoor smoker includes a smoking chamber positioned within a cabinet and a smoke generating assembly configured for selectively smoldering combustible material to create a flow of smoke. The method includes receiving a command to perform a smoking process at a smoke duty cycle, wherein the smoke duty cycle corresponds to a time relationship between an ON state and an OFF state of the smoke generating assembly and operating the smoke generating assembly to perform the smoking process utilizing the smoke duty cycle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
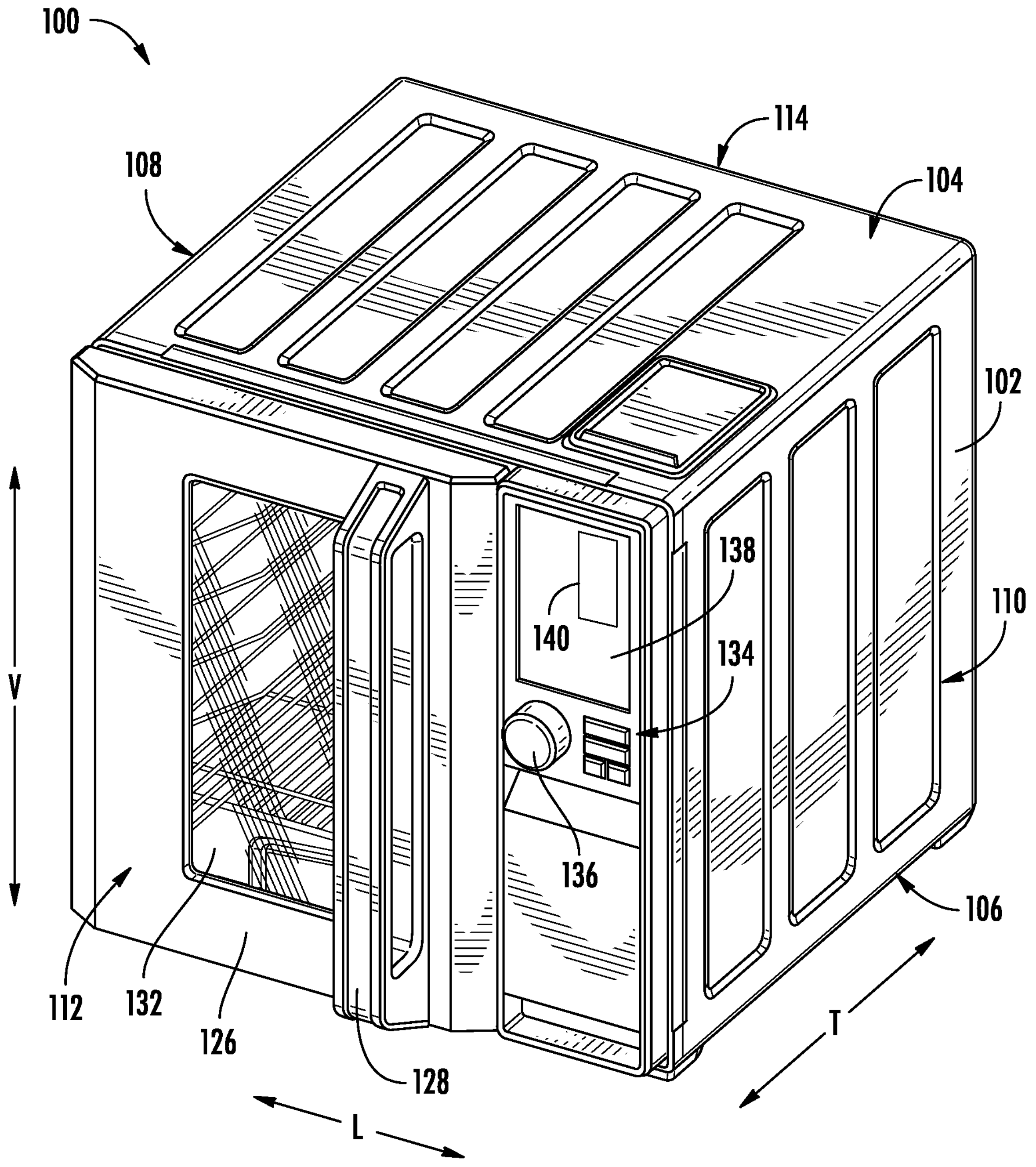
FIG. 1 provides a perspective view of an indoor smoker with a door in a closed position in accordance with an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
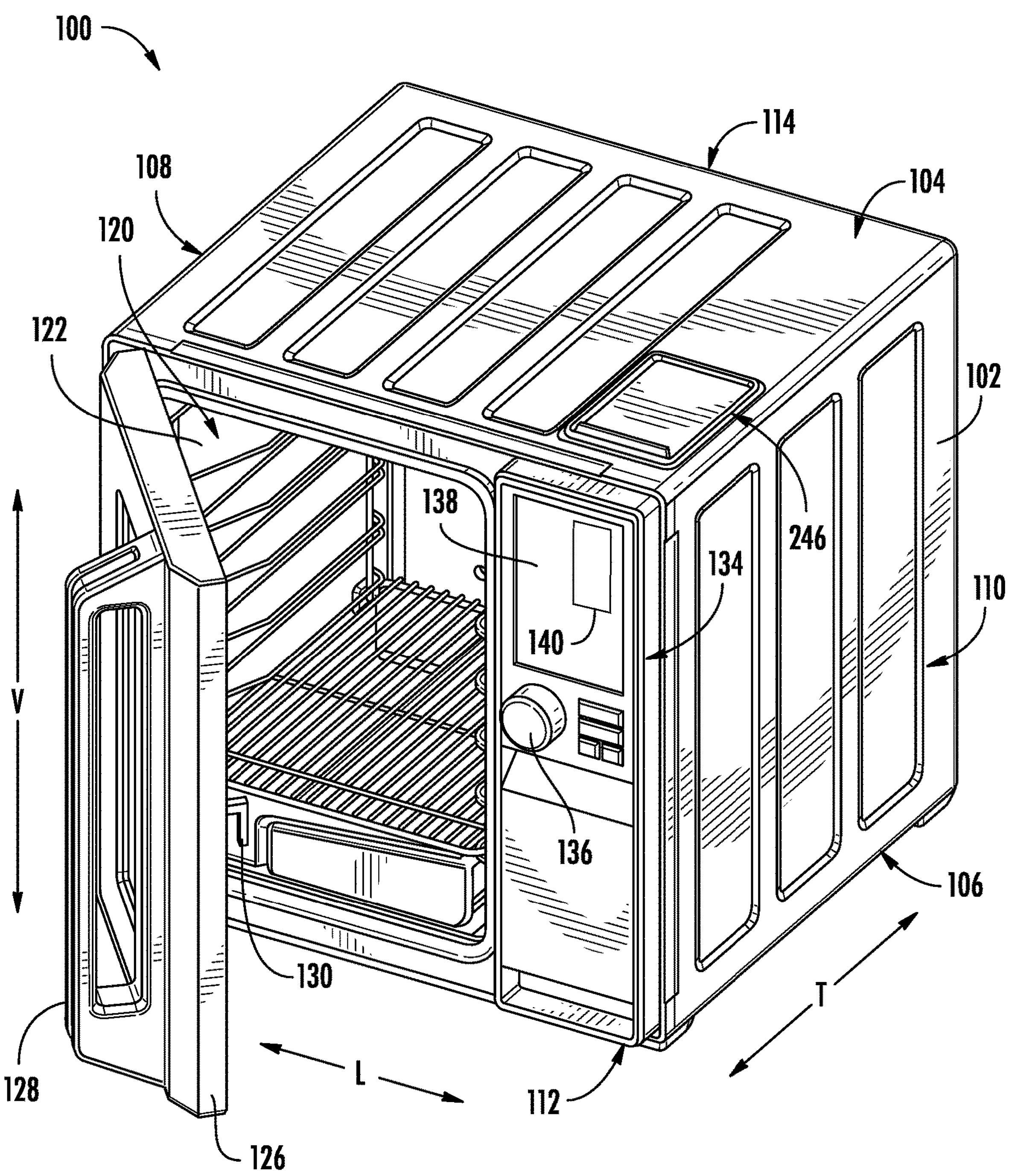
FIG. 2 provides a perspective view the exemplary indoor smoker of FIG. 1 with the door opened.

FIGS. 1 and 2 provide perspective views of an indoor smoker 100 according to an exemplary embodiment of the present subject matter with the door in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulation gap 124 (FIG. 4) defined between chamber walls 122 and cabinet 102. According to an exemplary embodiment, insulation gap 124 is filled with insulating material (not shown), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 (FIG. 2) is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or harmful emissions in an appliance.

Figure 3:
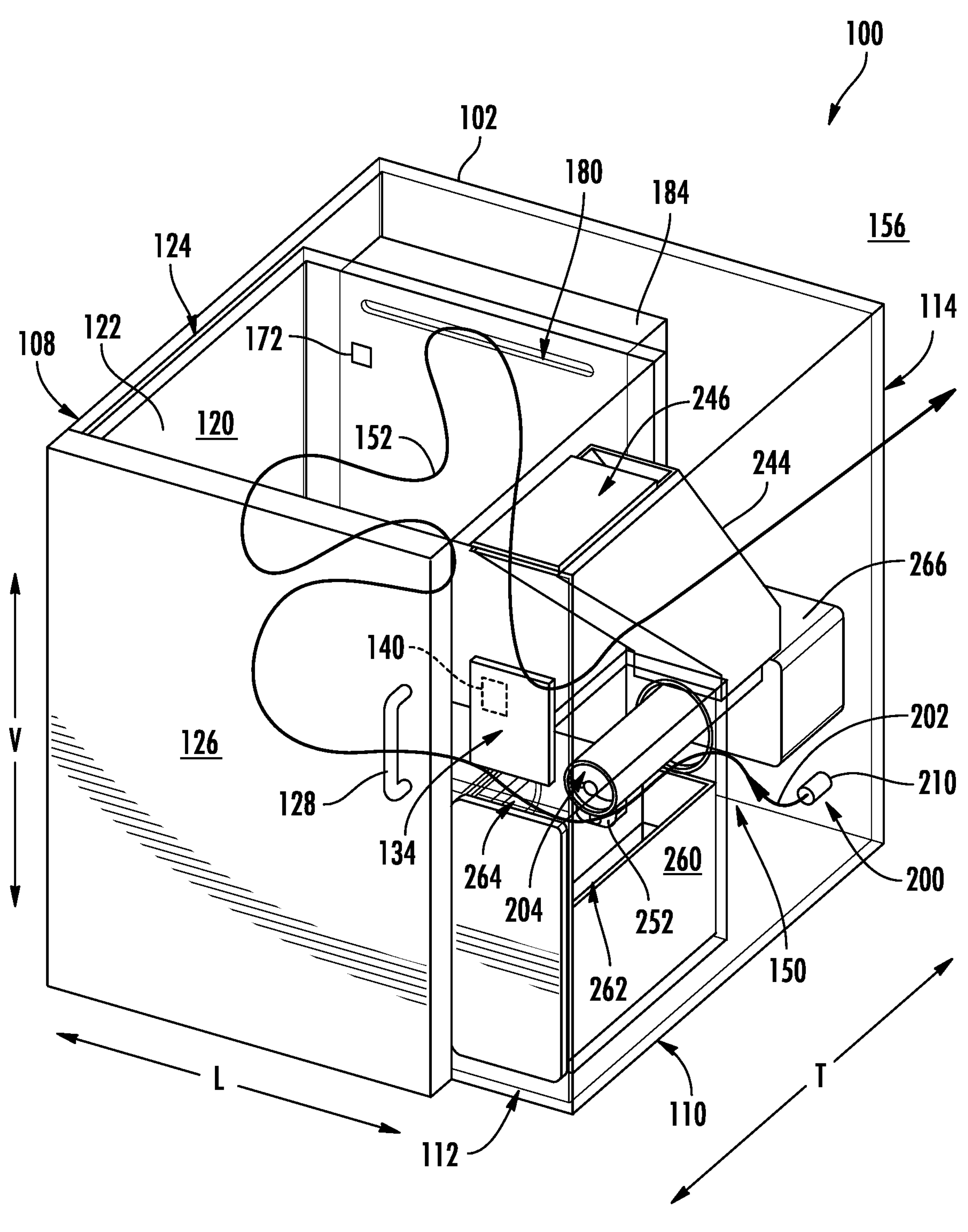
FIG. 3 provides a partial perspective view of the exemplary indoor smoker of FIG. 1 according to an exemplary embodiment of the present subject matter.

Referring now also to FIG. 3, various internal components of an indoor smoker 100 and their respective functions will be described according to an exemplary embodiment of the present subject matter. In this regard, FIG. 3 illustrates a partial perspective view of an indoor smoker 100 similar to that shown in FIG. 1. As shown, indoor smoker 100 generally includes smoking chamber 120 for receiving items to be cooked/smoked, a smoke generating device or smoke generating assembly 150 for generating a flow of smoke (indicated by reference numeral 152 in FIG. 3), and an exhaust system 154 for safely discharging that the air and/or smoke into an indoor environment 156 (i.e., outside of indoor smoker 100). Each of these systems and components will be described in detail below.

Figure 5:
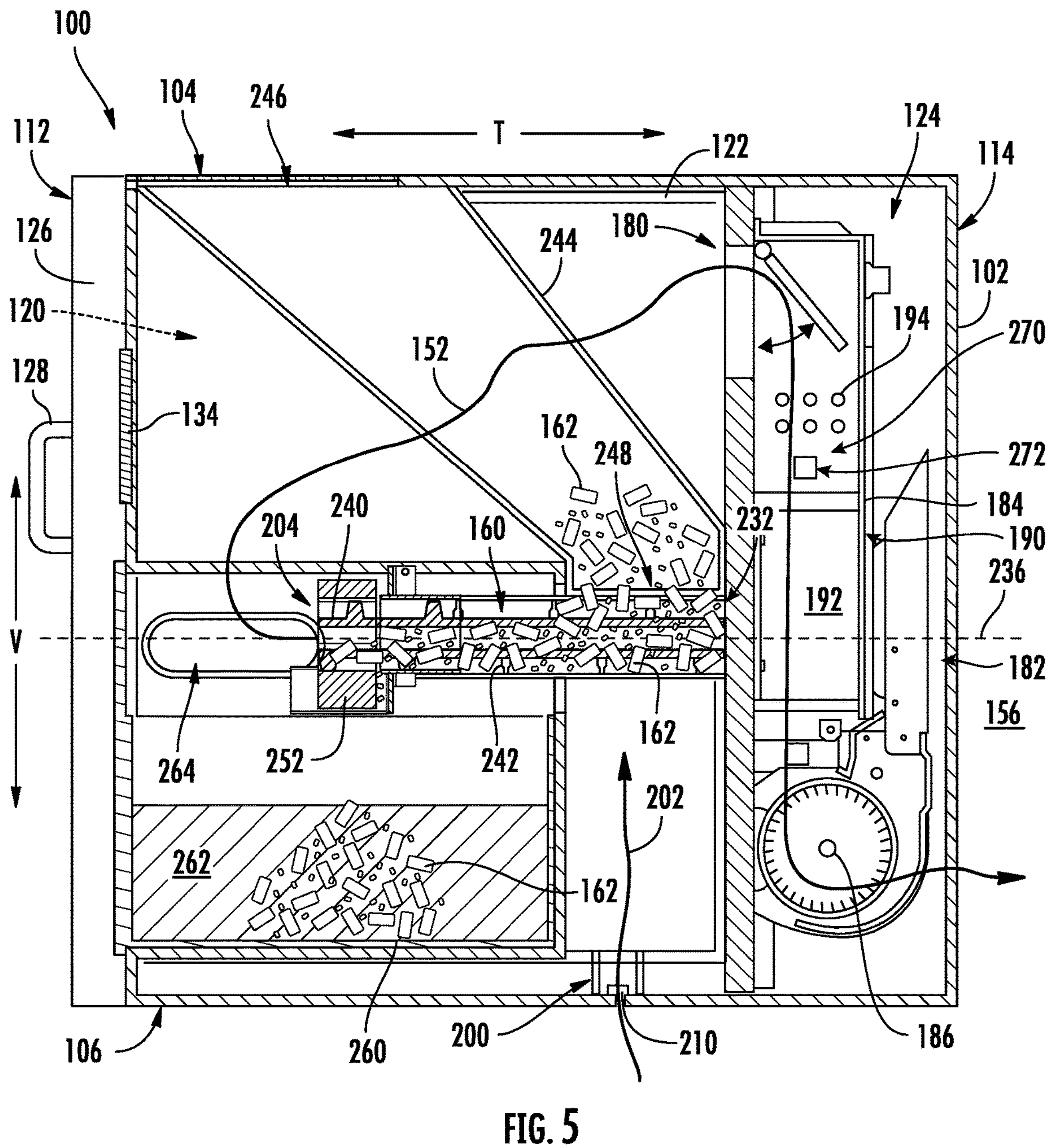
FIG. 5 is a side cross sectional view of the exemplary indoor smoker of FIG. 1 according to an exemplary embodiment of the present subject matter.

Referring to FIG. 5, smoke generating assembly 150 generally defines a smoldering chamber 160 which is configured for receiving combustible material 162. As used herein, "combustible material" is generally used to refer to any suitable material positioned within smoldering chamber 160 for generating smoke. Specifically, according to exemplary embodiments, combustible material 162 includes wood or wood byproducts, such as wood chunks, wood chips, wood pellets, or wood resin. According to the exemplary embodiment, smoke generating assembly 150 may include a door or another access panel (not shown) for providing selective access to smoldering chamber 160, e.g., to add additional combustible material 162.

Figure 4:
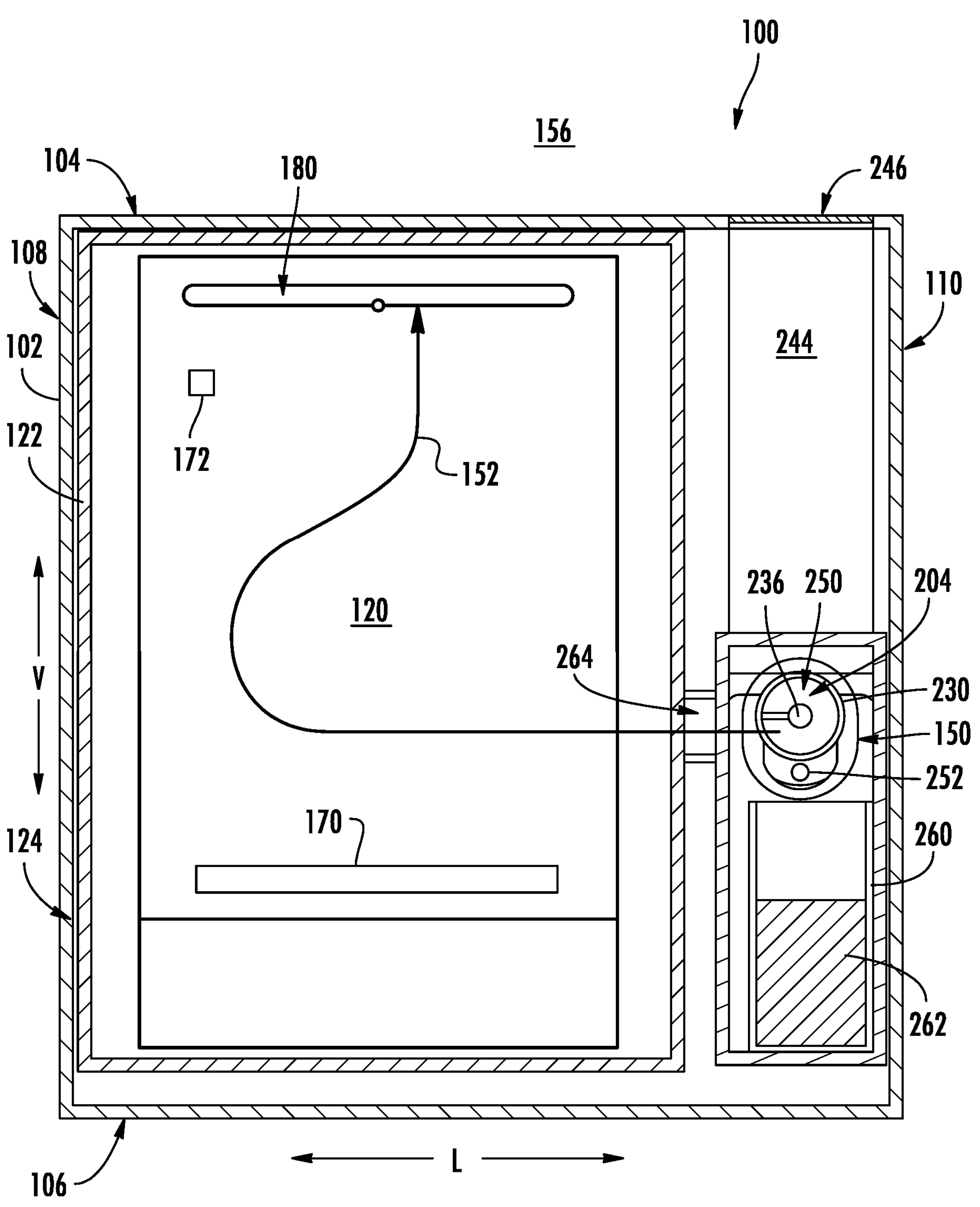
FIG. 4 is a front cross-sectional view of the exemplary indoor smoker of FIG. 1 according to an exemplary embodiment of the present subject matter.

As best shown in FIG. 4, in order to ensure a desirable cooking temperature within smoking chamber 120, indoor smoker 100 further includes a chamber heater 170 that is positioned within or otherwise in thermal communication with smoking chamber 120 for regulating the temperature in smoking chamber 120. In general, chamber heater 170 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 170 is operated independently of smoke generating assembly 150 (e.g., as described below), smoking chamber 120 may be maintained at any suitable temperature during a smoking process. More specifically, for example, chamber heater 170 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors which are generally operable to measure the internal temperature in indoor smoker 100, e.g., within smoking chamber 120 and/or smoldering chamber 160. More specifically, as illustrated, indoor smoker 100 includes a temperature sensor 172 positioned within smoking chamber 120 and being operably coupled to controller 140. In some embodiments, controller 140 is configured to vary operation of chamber heater 170 based on one or more temperatures detected by temperature sensor 172.

As described herein, "temperature sensor" may refer to any suitable type of temperature sensor. For example, the temperature sensors may be thermocouples, thermistors, or resistance temperature detectors. In addition, temperature sensor 172 may be mounted at any suitable location and in any suitable manner for obtaining a desired temperature measurement, either directly or indirectly. Although exemplary positioning of certain sensors is described below, it should be appreciated that indoor smoker 100 may include any other suitable number, type, and position of temperature sensors according to alternative embodiments.

As mentioned briefly above, indoor smoker 100 further includes an exhaust system 154 which is generally configured for safely discharging the flow of smoke 152 from indoor smoker 100. Specifically, according to the illustrated embodiment, exhaust system 154 generally extends between a chamber outlet 180 and a discharge vent 182 defined by cabinet 102 for directing the flow of smoke 152 from smoking chamber 120 to the environment 156. Although an exemplary exhaust system 154 is described below, it should be appreciated that variations and modifications may be made while remaining within the scope of the present subject matter. For example, the routing of ducts, the catalytic converter arrangement, and the types of sensors used may vary according to alternative embodiments. For example, although discharge vent 182 is illustrated as being defined proximate a top and back of cabinet 102, other suitable positions of discharge vent 182 and routing of the exhaust are possible and within the scope of the present subject matter.

As shown, exhaust system 154 includes an exhaust duct 184 that generally extends between and provides fluid communication between chamber outlet 180 and discharge vent 182. Indoor smoker 100 further includes an air handler 186 that is operably coupled with exhaust duct 184 facilitating the smoldering process and smoke generating process. For example, air handler 186 urges the flow of smoke 152 through exhaust duct 184 and out of discharge vent 182 to environment 156. According to the illustrated exemplary embodiment, air handler 186 is a centrifugal fan positioned within exhaust duct 184. However, it should be appreciated that according to alternative embodiments, air handler 186 may be positioned at any other suitable location and may be any other suitable fan type, such as a tangential fan, an axial fan, etc.

In addition, according to an exemplary embodiment, air handler 186 is a variable speed fan such that it may rotate at different rotational speeds, thereby generating different air flow rates. In this manner, the amount of smoke drawn from smoldering chamber 160 may be continuously and precisely regulated. Moreover, by pulsing the operation of air handler 186 or throttling air handler 186 between different rotational speeds, the flow of smoke 152 drawn into smoking chamber 120 may enter from a different direction, may have a different flow velocity, or may generate a different flow pattern within smoking chamber 120. Thus, by pulsating the variable speed fan or otherwise varying its speed, the flow of smoke 152 may be randomized, thereby eliminating stagnant regions within smoking chamber 120 and better circulating the flow of smoke 152 to provide a more even cooking/smoking profile.

As illustrated, indoor smoker 100 further includes a catalytic converter 190 which is positioned within exhaust duct 184 for lowering or removing volatile organic compounds (VOCs) from the flow of smoke 152. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 190 generally includes a catalytic element 192 and a catalyst heater 194. Although catalytic converter 190 is illustrated herein as being positioned within exhaust duct 184, it should be appreciated that according to other embodiments catalytic converter 190 be positioned at any other suitable location, so long as catalytic converter 190 is inline with the flow of smoke 152, such that volatile organic compounds may be reduced.

In general, catalytic element 192 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 192 may combine oxygen ($O_2$) with carbon monoxide (CO) and unburned hydrocarbons to produce carbon dioxide ($CO_2$) and water ($H_2O$). In addition, according to exemplary embodiments, catalytic element 192 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 194 is in thermal communication with catalytic element 192 for heating it to a suitable temperature, such as approximately 800° F. According to the illustrated embodiment, catalyst heater 194 is positioned upstream of catalytic element 192 to provide thermal energy through convection. However, it should be appreciated that according to alternative embodiments, catalyst heater 194 may be in direct contact with catalytic element 192 to provide thermal energy through conduction, or may be thermally coupled to catalytic element 192 in any other suitable manner. In order to ensure a catalyst temperature of catalytic element 192 remains above a temperature suitable for controlling emissions, indoor smoker 100 may further include a catalyst temperature sensor (not shown) that may be monitored by controller 140.

Referring still to FIG. 5, the construction and operation of smoke generating assembly 150 will be described in more detail according to an exemplary embodiment of the present subject matter. As illustrated, indoor smoker 100 defines an air inlet 200 for receiving air to support the combustion or smoldering process. Specifically, air inlet 200 is configured for receiving a flow of combustion air (indicated by reference numeral 202 in FIG. 5) from the ambient environment 156 surrounding indoor smoker 100 or from another air supply source. During a smoking process, combustible material 162 is ignited and the flow of combustion air 202 supports the smoldering process to generate the flow of smoke 152. Smoke generating assembly 150 further defines a smoke outlet 204 for providing a flow of smoke 152 into smoking chamber 120 during a smoking operation, as will be described in detail below.

In addition, indoor smoker 100 may further include features for preventing or regulating the flow of combustion air 202 from entering indoor smoker 100 from environment 156 when the flow of such air is not desired. In this regard, for example, indoor smoker 100 may include an inlet check valve 210 which is operably coupled to air inlet 200. In general, this check valve prevents the flow of combustion air 202 from entering smoldering chamber 160 when not desired. For example, inlet check valve 210 may have a "cracking pressure," which is used herein to refer to the pressure, or more precisely the negative pressure, required within smoldering chamber 160 to open inlet check valve 210. In this manner, inlet check valve 210 may be designed to permit the flow of combustion air 202 only when air handler 186 is operating and urging air through smoldering chamber 160, thus facilitating the quick and effective asphyxiation of combustible material 162 within smoldering chamber 160 when desired.

According to the illustrated embodiment, smoke generating assembly 150 generally includes a smoke barrel 230 that defines smoldering chamber 160. Specifically, smoke barrel 230 extends between a first end 232 and a second end 234 substantially along a central axis 236. Specifically, as illustrated, central axis 236 extends substantially within a horizontal plane within cabinet 102, e.g., directly along the transverse direction T. In general, smoke barrel 230 is configured for receiving the combustible material 162 and facilitating a smoldering process. As shown, smoke barrel 230 has a substantially cylindrical shape and is formed from a substantially rigid and temperature resistant material, such as steel. However, it should be appreciated that smoke barrel 230 may be formed from different materials, may have different geometries, and may be configured differently within cabinet 102 according to alternative embodiments of the present subject matter.

Smoke generating assembly 150 further includes a rotating auger 240 that is rotatably mounted within smoldering chamber 160 and generally rotates about central axis 236, e.g., such that rotating auger 240 is coaxial with smoke barrel 230. As shown, an outer diameter of rotating auger 240 is substantially equivalent to an inner diameter of smoke barrel 230, such that a helical blade 242 of rotating auger 240 may advance combustible material 162 within smoldering chamber 160 as rotating auger 240 is rotated about central axis 236. More specifically, the combustible material 162 is generally urged from first end 232 toward second end 234 of smoke barrel 230.

As illustrated, smoke generating assembly 150 may further include a hopper 244 that is generally configured for storing and selectively depositing combustible material 162 into smoldering chamber 160. More specifically, as illustrated, hopper 244 may be a large, tapered reservoir with a top opening 246 positioned at top 104 of cabinet 102. A user may fill hopper 244 by pouring or providing combustible material 162 into hopper 244 through top opening 246. Hopper 244 may taper toward a supply opening 248 positioned at a bottom of hopper 244. As shown, supply opening 248 opens into smoldering chamber 160 at a top of smoke barrel 230. More specifically, supply opening 248 is joined to smoke barrel 230 proximate first end 232 of smoke barrel 230. In this manner, fresh combustible material 162 is typically provided into smoldering chamber 160 proximate first end 232 of smoke barrel 230 and is urged by rotating auger 240 toward second end 234 of smoke barrel 230. As illustrated, smoke generating assembly 150 may generally define a discharge port 250 proximate second end 234 of smoke barrel 230 for discharging consumed combustible material 162.

Smoke generating assembly 150 further includes one or more smoldering heaters 252 which are positioned adjacent smoldering chamber 160 or otherwise placed in thermal communication with combustible material 162 stored in smoldering chamber 160 for smoldering combustible material 162. According to an exemplary embodiment, smoldering heater 252 may include one or more cartridge heaters or silicon nitride igniters. Alternatively, smoldering heater 252 may include any other suitable type, position, and configuration of heating elements. As used herein, the term "heating element," "heaters," and the like may generally refer to electric resistance heating elements, gas burners, microwave heating elements, halogen heating elements, or suitable combinations thereof.

As used herein, the verb "smolder" or variations thereof is intended to refer to burning a combustible material (e.g., combustible material 162) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 252 positioned within smoldering chamber 160. For typical combustible material used in smokers, e.g., wood and wood byproducts, a typical smoldering temperature is between about 650° F. and 750° F. However, the exact temperature may vary depending on the combustible material used, the air flow rate through smoldering chamber 160, the level of combustible material 162, and other factors.

According to the exemplary illustrated embodiment, smoldering heater 252 is positioned proximate second end 234 of smoke barrel 230. For example, smoldering heater 252 may at least partially define smoke outlet 204 of smoke generating assembly 150. Specifically, as illustrated, smoke outlet 204 corresponds to discharge port 250 of smoke generating assembly 150, which may simply be an open end of smoldering heater 252. In this manner, as rotating auger 240 rotates, combustible material 162 positioned within smoldering chamber 160 is slowly but progressively advanced past smoldering heater 252. After combustible material 162 positioned near smoldering heater 252 is consumed or smoldered, rotating auger 240 may rotate to advance the consumed material toward discharge port 250 where it may be pushed out of smoldering chamber 160.

According to exemplary embodiments, smoldering heater 252 may be positioned on a distal end of rotating auger 240, e.g., aligned along central axis 236 proximate second end 234. As such, rotating auger 240 may pass through smoke barrel 230 and through a central aperture smoldering heater 252 to extend out of discharge port 250. In this manner, rotating auger 240 may serve to advance combustible material 162 from first end 232 of smoke barrel 230, past second end 234 of smoke barrel 230, through and across smoldering heater 252, then out of discharge port 250.

According to an exemplary embodiment, a water extinguishing assembly 260 may be configured for receiving consumed combustible material 162 when discharged from smoke generating assembly 150. In this regard, for example, water extinguishing assembly 260 may be positioned directly below smoke barrel 230, smoldering heater 252, and/or discharge port 250 such that used combustible material 162 may fall therein and immediately extinguish. For example, according to the illustrated embodiment, water extinguishing assembly 260 is filled with water 262 to immediately extinguish combustible material 162 when dropped into water extinguishing assembly 260. However, it should be appreciated that other liquids or materials for extinguishing combustible material 162 may be contained within water extinguishing assembly 260. In addition, as illustrated, water extinguishing assembly 260 may be positioned a chamber inlet 264 that is positioned adjacent smoke outlet 204. In this manner, the flow of smoke 152 exiting smoke barrel 230 may pass directly into smoking chamber 120 through chamber inlet 264 while consumed combustible material 162 may fall directly into water 262 within water extinguishing assembly 260. Water extinguishing assembly 260 will be described in more detail with respect to FIGS. 8 through 11.

Figure 6:
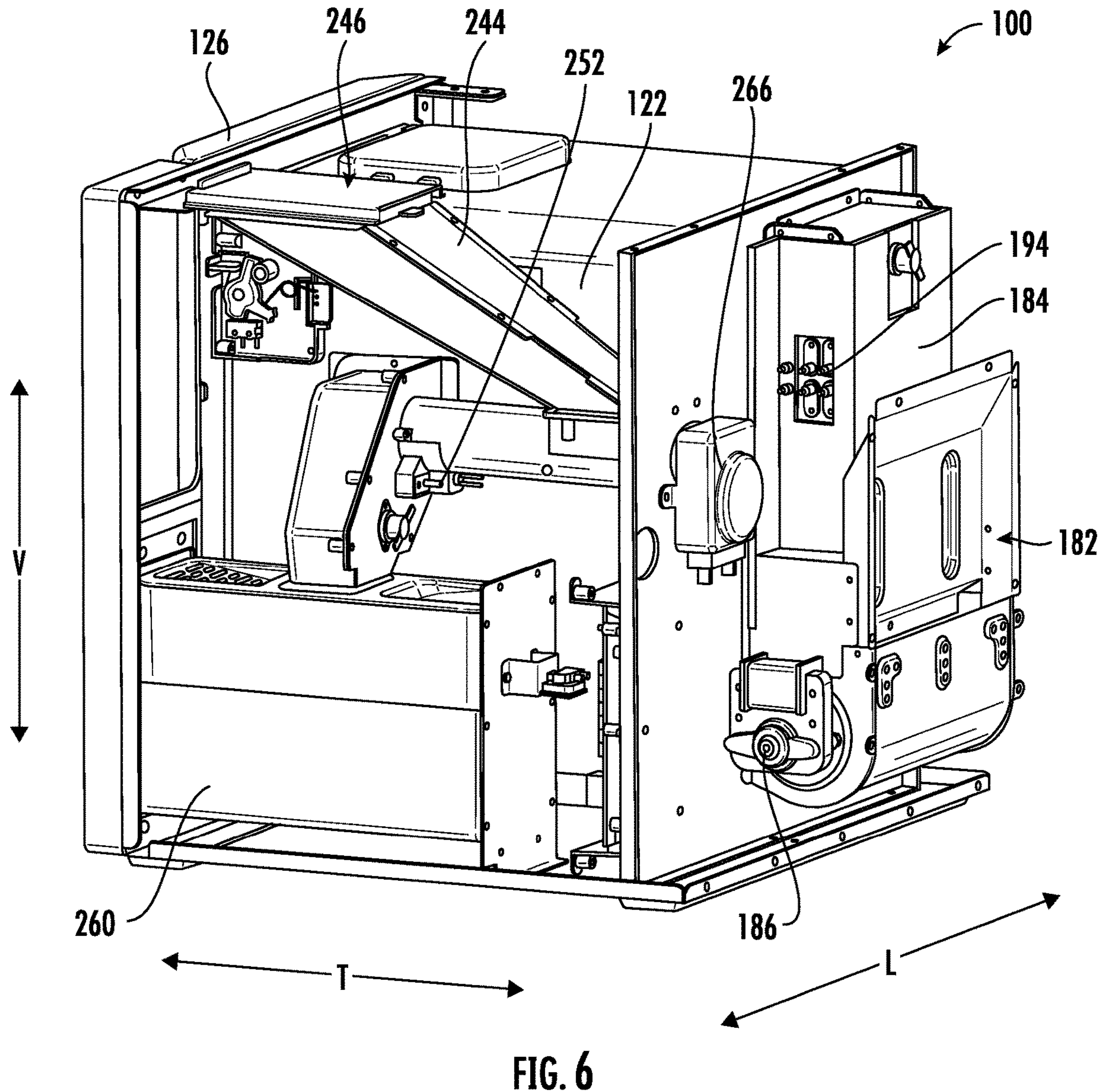
FIG. 6 provides another partial perspective view of the exemplary indoor smoker of FIG. 1 according to an exemplary embodiment of the present subject matter.
Figure 7:
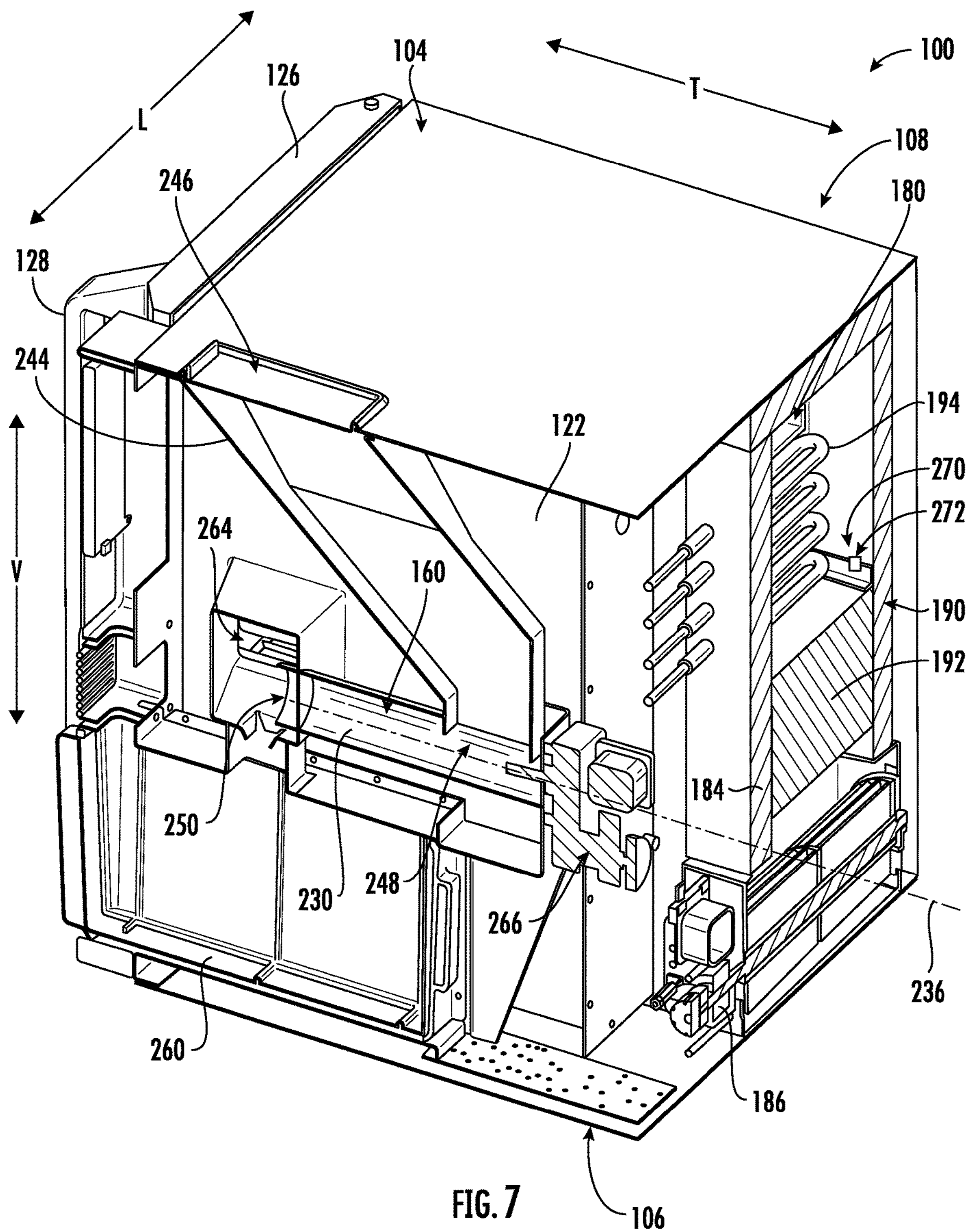
FIG. 7 provides another partial perspective view of the exemplary indoor smoker of FIG. 1 according to an exemplary embodiment of the present subject matter.

As best illustrated in FIGS. 6 and 7, smoke generating assembly 150 may further include a drive mechanism 266 that is mechanically coupled to rotating auger 240. Controller 140 (or another dedicated controller) may be in operative communication with drive mechanism 266 and may be configured for intermittently rotating the rotating auger 240 to advance combustible material 162 along central axis 236. Specifically, drive mechanism 266 may include a drive motor and a transmission assembly or another suitable geared arrangement for transferring torque from the drive motor to rotating auger 240. As used herein, "motor" may refer to any suitable drive motor and/or transmission assembly for driving rotating auger 240. For example, the drive motor may be a brushless DC electric motor, a stepper motor, or any other suitable type or configuration of motor. For example, the drive motor may be an AC motor, an induction motor, a permanent magnet synchronous motor, or any other suitable type of AC motor. In addition, the drive motor and the transmission assembly may include any suitable motor or transmission sub-assemblies, clutch mechanisms, or other components.

In order to facilitate proper smoldering of combustible material 162, it may be desirable to drive rotating auger 240 intermittently, e.g., in a non-continuous manner. Specifically, according to an exemplary embodiment, rotating auger 240 may be rotated for a particular time duration once during every predetermined rotation period. For example, the time duration of rotation may be the amount of time drive mechanism 266 should drive rotating auger 240 to discharge all combustible material 162 that is smoldering from smoke barrel 230. In addition, the predetermined rotation period may be the amount of time necessary for a fresh portion of the smoldering material 162 to be consumed. Notably, drive mechanism 266 may discharge combustible material 162 from smoke barrel 230 before combustible material 162 is fully consumed, e.g., to prevent forming ash which may introduce acrid smoke flavors. According to an exemplary embodiment, the time duration of rotation is approximately 12 seconds while the predetermined rotation period is three minutes. Other rotation schedules are possible and within the scope of the present subject matter. Indeed, such rotation schedules may vary based on a variety of factors, such as the combustible material used, the temperature of the smoldering heater, the rate of air flow through smoke barrel 230, etc.

Thus, during operation of indoor smoker 100, air handler 186 draws the flow of combustion air 202 into smoldering chamber 160 through air inlet 200. The flow of combustion air 202 and combustible material 162 in the smoldering chamber 160 generate the flow of smoke 152 which is drawn into smoking chamber 120 as described herein. The flow of smoke 152 passes through smoking chamber 120 for performing a smoking process on food items positioned therein before exiting smoking chamber 120 through chamber outlet 180. Air handler 186 then continues to urge the flow of smoke 152 through catalytic converter 190 and exhaust duct 184 before passing out discharge vent 182.

Referring now generally to FIGS. 5 and 7, indoor smoker 100 may further include an air quality monitoring system 270 that is generally configured to monitor the quality of the flow of smoke 152 passing through exhaust system 154. For example, air quality monitoring system 270 may be operably coupled to or positioned within exhaust duct 184 for monitoring the flow of smoke 152 and the operation of catalytic converter 190. In general, controller 140 (or another suitable controller) may be in operative communication with air quality monitoring system 270 and other components of indoor smoker 100 for operating indoor smoker 100 and implementing one or more steps of the methods described herein.

According to example embodiments of the present subject matter, air quality monitoring system 270 may include one or more air quality sensors (identified herein generally by reference numeral 272) that are configured for monitoring the flow of smoke 152. For example, air quality sensors 272 may be positioned and configured for providing data related to any suitable qualitative or quantitative condition of the flow of smoke 152. For example, air quality sensors 272 may include sensors for measuring at least one of carbon monoxide, formaldehyde, or other volatile organic compounds (VOCs). These air quality sensors 272 may provide feedback regarding VOCs to controller 140 in any suitable manner and in any suitable unit of measure, e.g., such as total volume, parts per million (ppm), etc. According to still other embodiments, air quality sensors 272 may include one or more optical sensors for detecting particulate matter within the flow of smoke 152.

In addition, it should be appreciated that air quality sensors 272 may be positioned at any suitable location for monitoring the flow of smoke 152. For example, according to an example embodiment, air quality monitoring system 270 may include a single air quality sensor 272 positioned downstream of catalytic element 192. In this regard, for example, air quality sensor 272 may be positioned between catalytic element 192 and air handler 186 within exhaust duct 184. In this manner, the air quality may be sensed immediately downstream of catalytic element 192 for improved measurement precision. According to still other embodiments, air quality sensor 272 may be positioned downstream of air handler 186, e.g., within discharge vent 182. According to still other embodiments, air quality sensor 272 may be positioned within the room where indoor smoker 100 is located and may be directly wired to controller 140 or configured for communicating wirelessly with controller 140.

Now that the construction of indoor smoker 100 according to exemplary embodiments have been presented, an exemplary method 300 of operating an indoor smoker will be described. Although the discussion below refers to the exemplary method 300 of operating indoor smoker 100, one skilled in the art will appreciate that the exemplary method 300 is applicable to the operation of a variety of other smoking appliances. In exemplary embodiments, the various method steps as disclosed herein may be performed by controller 140 or a separate, dedicated controller.

Figure 8:
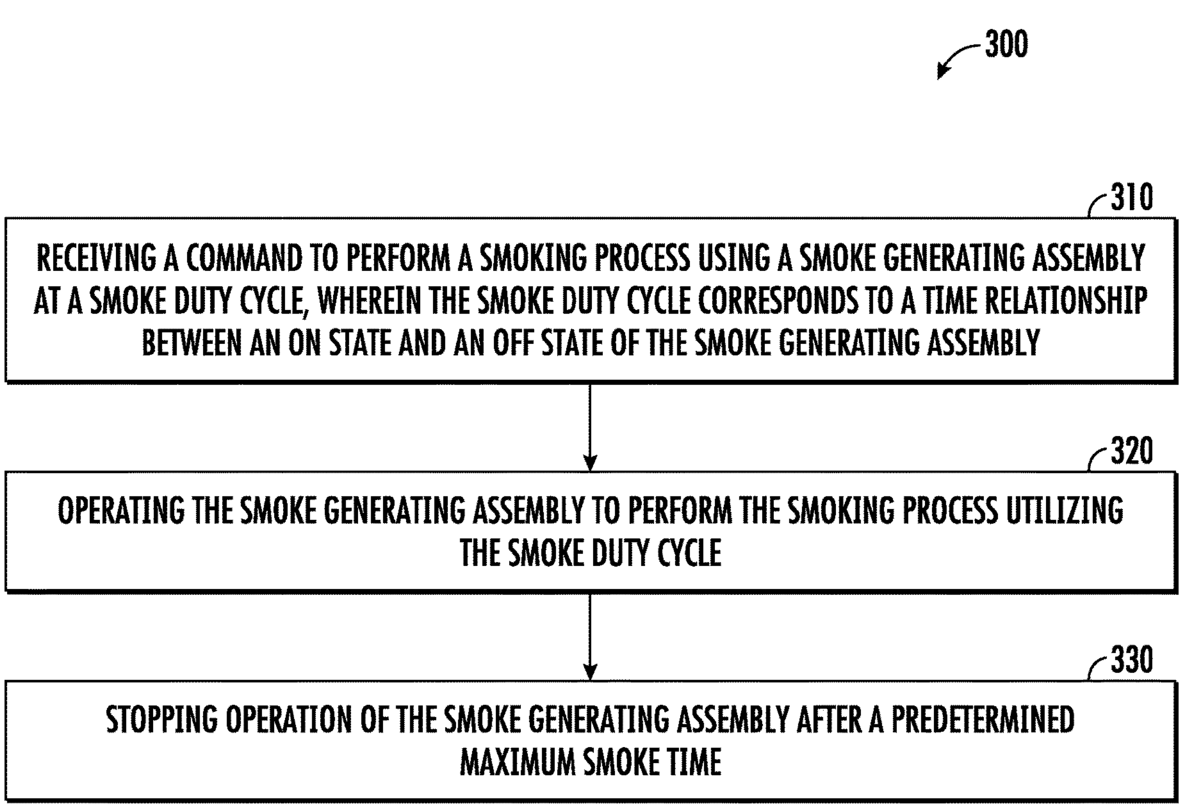
FIG. 8 provides a method of operating a smoke generating assembly of an indoor smoker using a smoke duty cycle according to an exemplary embodiment of the present subject matter.

Referring now to FIG. 8, method 300 includes, at step 310, receiving a command to perform a smoking process from a user of the appliance. For example, continuing the example from above, a user of indoor smoker 100 may provide a command to perform a smoking process having a predetermined cooking duration (e.g., referred to herein as total smoke time) where the smoke application provided during that cooking duration is adjustable by the user. It should be appreciated that a user may input the desired smoking profile and cooking duration in any suitable manner, e.g., such as through user interface panel 134 or a remote device connected to controller 140 through an external network (e.g., such as a user's cell phone).

Notably, conventional smoking appliances provide little versatility in terms of the ability to regulate the profile of smoke provided into the appliance during operation. However, aspects of the present subject matter are generally directed to improving the user adjustability of the smoking profile and other parameters of the smoking process. For example, according to an example embodiment, the command to perform the smoking process may include a desired smoke duty cycle which generally defines the smoke application profile throughout a smoking process or the specific on and off times of smoke generating assembly 150. For example, the smoke duty cycle may generally refer to a ratio of the amount of time that smoke generating assembly 150 is supplying smoke into smoking chamber 120 to the amount of time smoke generating assembly 150 is not supplying smoke into smoking chamber 120.

Figure 9:
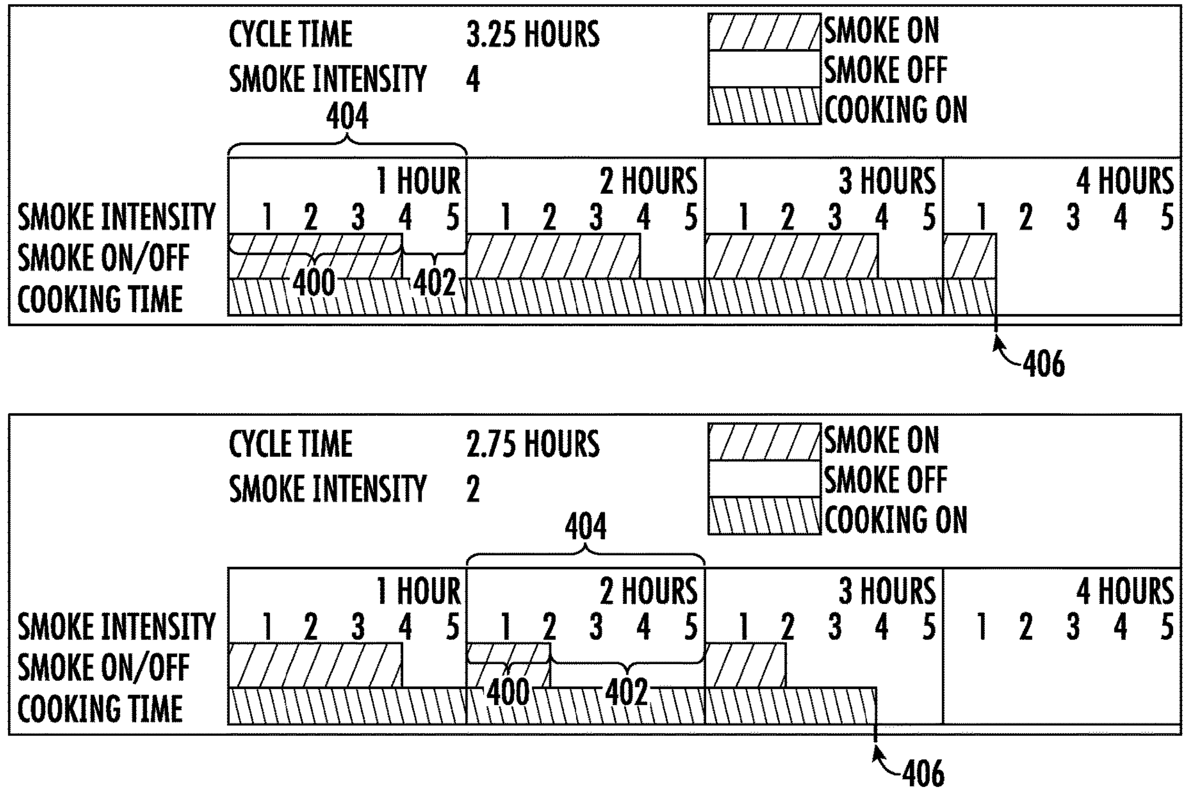
FIG. 9 illustrates plots showing the operation of an indoor smoker using smoke duty cycles according to an exemplary embodiment of the present subject matter.

Referring now specifically to FIG. 9, the smoke duty cycle may generally define a waveform of operation of smoke generating assembly 150 where the waveform defines ON periods (e.g., identified generally in FIG. 9 by reference numeral 400) and OFF periods (e.g., identified generally in FIG. 9 by reference numeral 402) of smoke generation. Thus, the duty cycle of smoke generating assembly 150 may be roughly proportional to the smoke provided into smoking chamber 120. In this regard, for example, a fifty percent duty cycle may correspond to smoke generating assembly 150 generating smoke during 50% of the waveform duration (e.g., identified generally in FIG. 9 by reference numeral 404), whereas a 30% duty cycle correspond to smoke generating assembly 150 generating smoke during 30% of the waveform duration 404. Accordingly, increasing the duty cycle of smoke generating assembly 150 results in the output of more smoke for a given time period.

For example, during the upper cooking cycle illustrated in FIG. 9, the smoke duty cycle may be 80% (i.e., a 4 out of 5 for smoke intensity) and the waveform duration may be 1 hour. Accordingly, smoke may be generated for the first 48 minutes of each hour (e.g., the ON state), while the last 12 minutes of each hour have no smoke generation (e.g., the OFF state). By contrast, during the lower cooking cycle illustrated in FIG. 9, the smoke duty cycle may be 20% (i.e., a 1 out of 5 for smoke intensity) and the waveform duration may be 1 hour. Accordingly, smoke may be generated for the first 12 minutes of each hour (e.g., the ON state), while the last 48 minutes of each hour have no smoke generation (e.g., the OFF state). It should be appreciated that according to alternative embodiments, the waveform duration may vary while remaining within the scope of the present subject matter. For example, the waveform duration may be 1 minute, 5 minutes, 10 minutes, 20 minutes, 30 minutes, 45 minutes, 1 hour, 2 hours, 4 hours, 6 hours, etc. In addition, the duty cycles may be selected in any suitable increment by the user of indoor smoker 100.

Notably, method 300 may further include receiving a total smoke time associated with the smoking process. In this regard, the total smoke time may generally refer to the total cooking process time as identified by reference numeral 406 in FIG. 9. For example, in the upper smoking cycle illustrated in FIG. 9, the total smoke time is approximately 3 hours and 12 minutes and the total smoke time of the lower cooking cycle is 2 hours and 48 minutes. In general, the smoke generation is adjusted on and off according to the smoke duty cycle intermittently throughout the entire total smoke time 406. In other words, the waveform duration 404 and associated duty cycle is repeated until the total smoke time 406 has elapsed. As illustrated in FIG. 9, chamber heater 170 may be operated independently of smoke generating assembly 150 during a smoking process. For example, according to the illustrated embodiment, the chamber temperature may be maintained at a constant temperature for the entire duration, e.g., until the total smoke time 406 has elapsed.

Referring again to FIG. 8, step 320 generally includes operating the smoke generating assembly to perform the smoking process utilizing the smoke duty cycle. In this regard, once properly programmed by the user, indoor smoker 100 may implement a cooking cycle as illustrated for example in FIG. 9, where the smoke generating assembly 150 operates according to the smoke duty cycle and waveform duration 404 for the entirety of total smoke time 406. In this manner, a user is provided with the ability to manipulate the cooking time and the smoke generation independently of each other.

In order to precisely regulate when smoke is generated and when it is not generated according to the smoke duty cycle, controller 140 may be programmed to carefully regulate the combustion of combustible material 162 as it passes through smoke generating assembly 150. For example, when smoke generating assembly 150 is in the ON state, smoldering heater 252 may be energized to a desirable setpoint and rotating auger 240 may be rotated at the desired pace for optimal smoke generation. In this manner, smoke generation during the ON phase of the smoke duty cycle may be maintained at the desired rate.

By contrast, when smoke generating assembly enters the OFF state, combustible material 162 may remain on smoldering heater 252 before being fully consumed. Accordingly, method 300 may further include steps for reducing smoke generation during the OFF state. For example, according to an embodiment of the present subject matter, entering the OFF state may include turning off the smoldering heater 252 and subsequently operating the auger 240 to discharge the combustible material 262 on the smoldering heater 252 when the smoldering heater 252 is turned off. In this manner, after the smoldering heater 252 has stopped generating heat, a relatively cool mass of combustible material 162 may be positioned on smoldering heater 252 to draw remaining heat from smoldering heater 252. According to still other embodiments, this new mass of combustible material may be allowed to sit on smoldering heater 252 for a predetermined delay time before rotating auger 240 again to discharge that material. At this point, smoldering heater 252 may be sufficiently cool to prevent smoldering of further combustible material 162 and smoke generation may be stopped.

Notably, generated smoke may generally have less effect on the flavor of the meat the longer the cooking cycle goes. Accordingly, method 300 may further include steps for preventing the unnecessary consumption of combustible material 162, e.g., at a time after which the cooking product is unlikely to absorb or accept any further smoke. Accordingly, method 300 may further include, at step 330, stopping operation of the smoke generating assembly after a predetermined maximum smoke time. This predetermined smoke time may be determined in any suitable manner and may be set by the manufacturer, programmed by the user, etc. For example, the predetermined smoke time may be 2 hours, 4 hours, 6 hours, 12 hours, or more.

FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using indoor smoker 100 as an example, it should be appreciated that this method may be applied to the operation of any smoking appliance.

As explained herein, aspects of the present subject matter are generally directed to an indoor smoker and a method of operating the same using an algorithm to adjust intensity of smoke inside the smoker's cavity. For example, the algorithm may enable users to adjust the smoke intensity levels to their desired preference levels (e.g., a range from 0 to 5, where 0 is a 0% duty cycle, 1 is a 20% duty cycle, 2 is a 40% duty cycle, 3 is a 60% duty cycle, 4 is an 80% duty cycle, and 5 is a 100% duty cycle). The intensity of smoke inside the smoker's cavity may be adjusted by regulating the ON/OFF duty cycle of the smoke generation system. When the cooking cycle reaches the 4th hour (240 minutes), the smoker may continue to cook the food to complete the preset time (or to reach the desired probe temperature) but no more smoke is generated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker defining a vertical direction, a lateral direction, and a transverse direction, the indoor smoker comprising:

a cabinet;

a smoking chamber positioned within the cabinet;

a smoke generating assembly configured for selectively smoldering combustible material to create a flow of smoke, wherein the smoke generating assembly comprises: a smoke barrel defining a smoldering chamber that extends between a first end and a second end along a central axis, the smoke barrel being configured for receiving the combustible material; an auger positioned within the smoke barrel and being rotatable about the central axis for selectively urging the combustible material from the first end toward the second end of the smoldering chamber; and a smoldering heater in thermal communication with the smoke barrel for smoldering the combustible material as the auger advances the combustible material past the smoldering heater; and a controller in operative communication with the smoke generating assembly, the controller being configured to:

receive a command to perform a smoking process at a smoke duty cycle, wherein the smoke duty cycle corresponds to a time relationship between an ON state and an OFF state of the smoke generating assembly; and operate the smoke generating assembly to perform the smoking process utilizing the smoke duty cycle, wherein entering the OFF state comprises:

turning off smoldering heater;

operating the auger to discharge the combustible material on the smoldering heater when the smoldering heater is turned off;

pausing for a predetermined delay time after operating the auger to discharge the combustible material; and operating the auger for an additional predetermined amount of time.

2. The indoor smoker of claim 1, wherein the controller is further configured to:

receive a total smoke time associated with the smoking process, wherein the smoke duty cycle has a waveform duration and the smoke generating assembly repeats operation at the smoke duty cycle for the waveform duration until the total smoke time has elapsed.

3. The indoor smoker of claim 2, wherein the waveform duration is 1 hour.

4. The indoor smoker of claim 1, wherein the controller is further configured to:

stop operation of the smoke generating assembly after a predetermined maximum smoke time.

5. The indoor smoker of claim 4, wherein the predetermined maximum smoke time is 4 hours.

6. The indoor smoker of claim 1, wherein smoldering heater operates at a target temperature and auger rotates at a target speed when smoke generating assembly is in the ON state.

7. The indoor smoker of claim 1, further comprising:

a chamber heater, wherein the chamber heater operates at a target temperature for a total smoke time.

8. The indoor smoker of claim 1, wherein the smoke duty cycle is received by a user input through a control panel of the indoor smoker or an external device.

9. A method of operating an indoor smoker, the indoor smoker comprising a smoking chamber positioned within a cabinet and a smoke generating assembly configured for selectively smoldering combustible material to create a flow of smoke, wherein the smoke generating assembly comprises: a smoke barrel defining a smoldering chamber that extends between a first end and a second end along a central axis, the smoke barrel being configured for receiving the combustible material; an auger positioned within the smoke barrel and being rotatable about the central axis for selectively urging the combustible material from the first end toward the second end of the smoldering chamber; and a smoldering heater in thermal communication with the smoke barrel for smoldering the combustible material as the auger advances the combustible material past the smoldering heater, the method comprising:

receiving a command to perform a smoking process at a smoke duty cycle, wherein the smoke duty cycle corresponds to a time relationship between an ON state and an OFF state of the smoke generating assembly; and operating the smoke generating assembly to perform the smoking process utilizing the smoke duty cycle, wherein entering the OFF state comprises:

turning off smoldering heater;

operating the auger to discharge the combustible material on the smoldering heater when the smoldering heater is turned off;

pausing for a predetermined delay time after operating the auger to discharge the combustible material; and operating the auger for an additional predetermined amount of time.

10. The method of claim 9, further comprising:

receiving a total smoke time associated with the smoking process, wherein the smoke duty cycle has a waveform duration and the smoke generating assembly repeats operation at the smoke duty cycle for the waveform duration until the total smoke time has elapsed.

11. The method of claim 10, wherein the waveform duration is 1 hour.

12. The method of claim 9, further comprising:

stopping operation of the smoke generating assembly after a predetermined maximum smoke time.

13. The method of claim 12, wherein the predetermined maximum smoke time is 4 hours.

* * * * *